United States Patent
Kodaira et al.

(10) Patent No.: US 8,686,305 B2
(45) Date of Patent: Apr. 1, 2014

(54) HANDLE SWITCH OF VEHICLE

(75) Inventors: Shigeru Kodaira, Saitama (JP); Koichi Shimamura, Saitama (JP); Kota Nakahira, Saitama (JP); Akira Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 650 days.

(21) Appl. No.: 13/001,572

(22) PCT Filed: Jun. 26, 2009

(86) PCT No.: PCT/JP2009/002965
§ 371 (c)(1),
(2), (4) Date: Jan. 21, 2011

(87) PCT Pub. No.: WO2010/001568
PCT Pub. Date: Jan. 7, 2010

(65) Prior Publication Data
US 2011/0108397 A1 May 12, 2011

(30) Foreign Application Priority Data
Jul. 2, 2008 (JP) ................................ 2008-173329

(51) Int. Cl.
*H01H 9/00* (2006.01)
(52) U.S. Cl.
USPC ..................... 200/61.54; 200/61.85
(58) Field of Classification Search
USPC ........................................... 200/61.54, 61.85
See application file for complete search history.

(56) References Cited

U.S. PATENT DOCUMENTS

| | | | |
|---|---|---|---|
| 6,538,221 B1 * | 3/2003 | Nishimoto et al. | ........... 200/334 |
| 6,695,090 B2 | 2/2004 | McAllister | |
| 7,402,767 B2 | 7/2008 | Tozuka et al. | |
| 2001/0022265 A1 * | 9/2001 | Ase et al. | ................... 200/61.54 |

FOREIGN PATENT DOCUMENTS

| | | |
|---|---|---|
| EP | 1 842 765 A1 | 10/2007 |
| JP | 63-112189 U | 7/1988 |
| JP | 9-231868 A | 9/1997 |
| JP | 2000-016366 A | 1/2000 |
| JP | 2002-324459 A | 11/2002 |
| JP | 2003-072616 A | 3/2003 |
| JP | 2003-312564 A | 11/2003 |
| JP | 2004-224192 A | 8/2004 |
| JP | 2004-530586 A | 10/2004 |
| JP | 2005-053452 A | 3/2005 |

* cited by examiner

*Primary Examiner* — Renee Luebke
*Assistant Examiner* — Lheiren Mae Caroc
(74) *Attorney, Agent, or Firm* — Carrier Blackman & Associates, P.C.; Joseph P. Carrier; Jeffrey T. Gedeon

(57) ABSTRACT

This invention is directed to providing a handle switch which is easy in operating a horn switch and also can be easily distinguished from other switches.
In a handle switch 30 of a vehicle, a horn switch 32 is disposed at a position which is overlaid on an axis line (D) of a handle grip 10 when a housing 60 is projected from a driver's front view direction and also on the vehicle body rear side further than other switches. Other switches including an optical-axis changing switch 31 and a turn signal switch 33 are disposed so as to deviate vertically with respect to the horn switch 32. The horn switch 32 is formed so as to be longer in the axis line direction of the handle grip 10, swinging about a swing shaft 36 installed at the end closer to the handle grip 10 by being pressed toward the vehicle body front side. The horn switch 32 is increased in area of an operating surface 32e, a clearance between upper and lower contour lines and a protruding amount from the housing 60, respectively, from a vehicle body outward part 32d toward a vehicle body inward part 32c.

17 Claims, 6 Drawing Sheets

Fig. 1

HANDLE SWITCH OF VEHICLE

TECHNICAL FIELD

The present invention relates to a handle switch of a vehicle and, in particular, it is to provide a handle switch of a vehicle which is easy in operating a horn switch and also easily distinguished from other switches.

BACKGROUND ART

There is conventionally known a constitution in which in vehicles including a two-wheel vehicle which steer directly the front wheel by using handlebars, a switch box having switches for operating a horn, a headlight, turn signal lamps, etc., is attached adjacent to the grip part of the handlebar so as to operate various types of electrical components, with the grip part of the handlebar kept held. In most cases, a turn signal switch is located at the center and a horn switch is below.

Patent Document 1 has disclosed such a handle switch that in a switch box attached to the handlebar on the left side, a turn signal switch is arranged in the vicinity of the lower end of the switch box, and a horn switch outside in the vehicle-width direction and a dimmer switch (optical-axis changing switch) inside in the vehicle-width direction are arranged adjacently at a position there above along an axis line direction of the handlebar. According to this constitution, it is possible to dispose the horn switch at a position adjacent to the left hand of a rider.

[Patent Document 1] JP-A-2005-53452

SUMMARY OF INVENTION

Technical Problem

As described above, since a handle switch in which an ordinary horn switch is located below is away from the axis line of the handlebar, improvement in operability has been demanded. Further, as disclosed in the Patent Document 1, there is a handle switch in which the horn switch and the dimmer switch are arranged along the axis line direction of the handlebar. In the handle switch, when the horn switch is operated by a quick decision, the tip of any finger may touch an optical-axis changing switch. Still further, on passage through a blind intersection, with the tip of any finger placed on the horn switch or the like, the horn switch may be actuated unintentionally due to vibrations while traveling.

An object of the present invention is to provide a handle switch which solves the above-described problem of a conventional technology and is easy in operating a horn switch and also easily distinguished from other switches.

Solution to Problem

The present invention has a first feature in that a handle switch of a vehicle comprises a switch housing having a horn switch and at least one of other switches is arranged adjacent to a handle grip attached to an end of a handlebar; wherein the horn switch is disposed at a position which is overlaid on an axis line of the handle grip when the switch housing is projected from a driver's front view direction and also on a vehicle body rear side further than the other switches; and the other switches are disposed so as to deviate vertically with respect to the horn switch.

The present invention has a second feature in that a lever for brake or clutch which is operated with the handle grip being held and also swings about a pivot shaft in a vehicle body front-back direction is installed adjacent to the switch housing; and the horn switch is disposed at a position which is overlaid on a line linking an axis line of the handle grip with a center position of the pivot shaft when the switch housing is projected from the axis line direction of the handle grip.

The present invention has a third feature in that the horn switch is constituted so as to swing about a swing shaft installed on an end of the horn switch closer to the handle grip by being pressed toward the axis line of the handle grip.

The present invention has a fourth feature in that the horn switch is disposed so as to protrude outward from the switch housing; and the horn switch protrudes from the switch housing to a greater extent toward a vehicle body center side along the axis line of the handle grip from the end thereof closer to the handle grip.

The present invention has a fifth feature in that the horn switch hardly protrudes at the end closer to the handle grip.

The present invention has a sixth feature in that the horn switch is increased in area of an operating surface toward a vehicle body center side along the axis line of the handle grip from the end closer to the handle grip.

The present invention has a seventh feature in that the horn switch has two contour lines to vertically oppose each other across the axis line of the handle grip; and a clearance between the two contour lines is gradually increased towards a vehicle body center along the axis line of the handle grip from the end closer to the handle grip.

The present invention has a eighth feature in that of contour lines of the other switches, one side adjacent to the horn switch is formed so as to run along one of the two contour lines of the horn switch.

The present invention has a ninth feature in that a vehicle body inward part of the horn switch is disposed closer to a vehicle body center than the other switches.

The present invention has a tenth feature in that the horn switch is shaped so as to have its longitudinal direction on the axis line of the handle grip.

The present invention has a eleventh feature in that the other switches include at least a turn signal switch or a dimmer switch for a headlight.

Advantageous Effects of Invention

The present invention has a first feature in that a handle switch of a vehicle comprises a switch housing having a horn switch and at least one of other switches is arranged adjacent to a handle grip attached to an end of a handlebar; wherein the horn switch is disposed at a position which is overlaid on an axis line of the handle grip when the switch housing is projected from a driver's front view direction and also on a vehicle body rear side further than the other switches. Therefore, the horn switch is disposed at a position where a rider effortlessly extends his or her thumb along the axis line direction of a handle grip on a state that the rider holds the handle grip, thereby giving an improved operability to the horn switch. Furthermore, in a state that the rider holds the handle grip, he or she is able to easily place his or her finger on the horn switch. Still further, the present invention has a feature in that the other switches are disposed so as to deviate vertically with respect to the horn switch. Therefore, since there are no other switches in the axis line direction of the handle grip, it is possible to reduce the possibility that the other switches may be touched during the operation of the horn switch.

The present invention has a second feature in that a lever for brake or clutch which is operated with the handle grip being held and also swings about a pivot shaft in a vehicle body front-back direction is installed adjacent to the switch housing; and the horn switch is disposed at a position which is overlaid on a line linking an axis line of the handle grip with a center position of the pivot shaft when the switch housing is projected from the axis line direction of the handle grip. Therefore, it is possible to dispose the horn switch in such a range that a rider effortlessly extends his or her thumb to the axis line direction of the handle grip on a state that the rider holds the handle grip.

The present invention has a third feature in that the horn switch is constituted so as to swing about a swing shaft installed on an end of the horn switch closer to the handle grip by being pressed toward the axis line of the handle grip. Therefore, there is obtained a swing-type horn switch actuated by pressing a part closer to the vehicle body center. Thereby, the possibility is reduced that the horn switch may be pressed due to vibrations or the like while traveling, with the thumb placed on the horn switch, and also, by extending the thumb slightly in the vehicle body inside direction, a rider is able to actuate only the horn switch strictly as he or she intends. Therefore, it is possible to shift smoothly to the operation of other switches on a state that a finger is placed on the horn switch.

The present invention has a fourth feature in that the horn switch is disposed so as to protrude outward from the switch housing; and the horn switch protrudes from the switch housing to a greater extent toward a vehicle body center side along the axis line of the handle grip from the end thereof closer to the handle grip. Therefore, it is possible to easily perceive which position of the horn switch is touched by the thumb. Further, the horn switch protrudes to a greater extent toward the vehicle body center. More specifically, the horn switch protrudes to a lesser extent toward the handle grip. Therefore, when the thumb is moved up and down with the handle grip kept held, the tip of the thumb is less likely to be caught by the horn switch, thus making it possible to operate the horn switch smoothly.

The present invention has a fifth feature in that the horn switch hardly protrudes at the end closer to the handle grip. Therefore, the tip of a finger is further less likely to be caught by the horn switch, thus making it possible to operate other switches smoothly.

The present invention has a sixth feature in that the horn switch is increased in area of an operating surface toward a vehicle body center side along the axis line of the handle grip from the end closer to the handle grip. Therefore, the horn switch is decreased in area of an operating surface toward the handle grip, and when the thumb is moved up and down to operate other switches, with the handle grip kept held, the tip of the finger is less likely to be caught by the horn switch. Further, the operating surface is smaller in area on the handle grip, thereby a swing shaft can be made shorter. It is, therefore, possible to reduce friction resistance of the swing shaft and to improve the actuation performance.

The present invention has a seventh feature in that the horn switch has two contour lines to vertically oppose each other across the axis line of the handle grip; and a clearance between the two contour lines is gradually increased towards a vehicle body center along the axis line of the handle grip from the end closer to the handle grip. Therefore, the end of the operation part is larger in area than the end of the swing shaft, and the horn switch can be easily pressed and operated. Further, the thumb moves laterally, by which the shape of the horn switch can be easily perceived. Still further, it is possible to obtain a unprecedented, uniquely designed horn switch.

The present invention has a eighth feature in that of contour lines of the other switches, one side adjacent to the horn switch is formed so as to run along one of the two contour lines of the horn switch. Therefore, a clearance formed between the horn switch and other switches is to be formed with a certain width kept, thus making it possible to further reduce a possibility that the other switches may be touched on operation of the horn switch.

The present invention has a ninth feature in that a vehicle body inward part of the horn switch is disposed closer to a vehicle body center than the other switches. Therefore, it is possible to easily dispose all switches along a locus of the tip of the finger formed when the thumb is moved up and down with the handle grip kept held. Thereby, each of the switches is further improved in operability.

The present invention has a tenth feature in that the horn switch is shaped so as to have its longitudinal direction on the axis line of the handle grip. Therefore, there is obtained a horn switch the shape of which can be easily perceived when the horn switch is moved in the axis line direction with a finger placed on the horn switch, and therefore operated easily.

The present invention has a eleventh feature in that the other switches include at least a turn signal switch or a dimmer switch for a headlight. Therefore, switches used more frequently are arranged adjacent to a horn switch, thereby providing a handle switch higher in operability.

DESCRIPTION OF EMBODIMENTS

Hereinafter, a detailed description will be given of preferred embodiments of the present invention with reference to drawings. FIG. 1 is a partially enlarged view of a two-wheeled motorcycle 1 to which a handle switch of one embodiment of the present invention is applied. This drawing illustrates a handle and its vicinity as viewed from above and rear of the vehicle body, giving a state which is substantially the same as that as viewed by a rider seated on the motorcycle.

A steering handle 15 for steering the front wheel (not illustrated) is covered at the vehicle body front side with a cowling 2 as an exterior component. A transparent or a semi-transparent windshield screen 3 is attached at the upper central part of the cowling 2, and a meter unit 4 including a speedmeter and a tachometer is disposed below thereof. The front wheel of the two-wheeled motorcycle 1 is pivotally supported at the lower ends of a pair of right and left front forks 8 so as to rotate freely. An upper part of the front fork 8 is fixed by a top bridge 6 having a key cylinder 7. The top bridge 6 is pivotally supported on a vehicle body frame (not illustrated) of the two-wheeled motorcycle 1 so as to move rotationally. A pair of right and left handlebars 9 which constitute the steering handle 15 are fixed at the upper ends of the front forks 8. Thereby, the steering handle 15 can be used to steer the front wheel. A fuel tank 5 is disposed between the top bridge 6 and a seat (not illustrated).

A handle grip 10 formed with cylindrical rubber or the like and held by a rider is attached at the ends of the right and left handlebars 9. Levers positioned on the vehicle body front side of the handle grip 10 are a front wheel brake lever 11 on the right side and a clutch lever 12 on the left side. The handle grip 10 on the right side is supported so as to move rotationally with respect to the handlebar 9 and constituted so as to adjust the output of a power source through rotational operation.

Adjacent to the vehicle body center side of the handle grip 10, a handle switch unit provided with switches of various types of electrical components is attached to the right and left handlebars 9. An engine stop switch 51, a hazard flasher switch 52 and a starter switch 53 are installed at the handle switch 50 on the right side, whereas a dimmer switch (optical-axis changing switch) 31 for a headlight, a horn switch 32, a turn signal switch 33 are installed at the handle switch 30 on the left side. The handle switch of the present invention is applied to the handle switch 30 on the left side having the horn switch 32.

FIG. 2 is a front elevational view of the handle switch 30. The handle switch 30 is attached to the handlebar 9 so that the face indicated by the front elevational view turns to the rider side (the driver side). Further, FIG. 3 is a top view as viewed in the direction of A in FIG. 2, and FIG. 4 is a side elevational view as viewed in the direction of B in FIG. 2. Still further, FIG. 5 is a cross sectional view taken along the line E-E in FIG. 3. The same symbols as those described previously indicate the same or similar parts.

A housing 60 formed with a resin or the like is constituted with a front-side (vehicle body rear side) half body 61 and a back-side (vehicle body front side) half body 62 regarding to the rider (driver) which are divided into two portions in the vehicle body front-back direction across the handlebar 9. A seesaw-type dimmer switch 31, a swing pressing-type horn switch 32 and a turn signal switch 33 which is tilted laterally as illustrated are installed at the front-side half body 61. These three switches can be operated only by moving the thumb with the handle grip 10 kept held.

Further, a passing light switch 34 which can be operated by the index finger, with the handle grip 10 kept held, is installed at the back-side half body 62 of the housing 60. The passing light switch 34 is constituted so as to be swung and actuated by pulling forward a projected part 34a extending outward in the vehicle-width direction in such a manner as to catch the projected part with the tip of the finger. It is noted that a drain hole 35 having internally a labyrinth structure is installed at the lower part of the front-side half body 61.

The three switches to be attached on the front-side half body 61 are constituted so that, with respect to the horn switch 32 positioned approximately at the center in the vertical direction, the other two switches are arranged above and below when the handle switch 30 is viewed from the front. More specifically, the horn switch 32 is disposed at a position which is overlaid on the axis line (D) of the handle grip 10 when projected so as to be viewed from the front and also disposed so as to be positioned on the vehicle body rear side further than the other two switches. According to this constitution, the horn switch 32 is disposed at a position where a rider effortlessly extends his or her thumb along the direction of the axis line (D) on a state that the rider holds the handle grip 10, thereby improving the operability of the horn switch 32. Further, since there are no other switches in the direction of the axis line (D), it is possible to easily distinguish the horn switch 32 from the other switches.

In this instance, a position at which the horn switch 32 is attached is confirmed, with attention given to a case where it is viewed from the axis line direction of the handle grip 10. FIG. 9 is a top view of the handle switch 30, showing arrangement relationships with peripheral components. Further, FIG. 10 is a side elevational view of the handle switch 30 including a cross sectional view taken along the line F-F in FIG. 9. The same symbols as those described previously indicate the same or similar parts. A holder 80 for pivotally supporting a clutch lever 12 so as to swing freely is attached in the vicinity of the handle switch 30 which is fixed on the handlebar 9. A master cylinder (not illustrated) for a hydraulic clutch in association with the clutch lever 12 is internally installed on the holder 80. A reserve tank 83 for clutch fluid is installed at one end of the holder 80. A holder half-body 81 is fixed by using a bolt 82, by which a pivot shaft 85 of the clutch lever 12 is attached to the holder 80 clamped to the handlebar 9. The pivot shaft 85 is arranged on the vehicle body front side of the handle switch 30 with its axis line directed in the vehicle body vertical direction. Thereby, the clutch lever 12 is pivotally supported so as to swing in the vehicle body front-back direction.

With reference to the side elevational view of FIG. 10, the horn switch 32 is disposed so as to be overlaid on a line (H) which links an axis line (D) of the handle grip 10 with a center position G of the pivot shaft 85 when the handle switch 30 is viewed as projected from the axis line direction of the handle grip 10. According to the above arrangement, the horn switch 32 is disposed in a range where a driver effortlessly extends his or her thumb along the axis line direction of the handle grip on a state that the driver holds the handle grip 10, thus making it possible to provide high operability. Further, according to the above arrangement, the horn switch 32 is to be positioned at a position which is overlaid on a swing face formed when the clutch lever 12 swings. Thereby, for example, upon operation of the horn switch 32 with the clutch lever 12 kept held, a positional relationship of the thumb with other fingers is less likely to change, by which the horn switch 32 can be kept high in operability. It is noted that in the present embodiment, the horn switch 32 is disposed at a position where the line (H) is substantially in alignment with an approximately central position of the horn switch 32 in the vertical direction, that is, approximately at the center of the housing 60. As shown by the dotted lines (O) and (P), the disposing position is allowed to move vertically within a range at which the horn switch 32 is at least partially overlaid on the line (H). Further, instead of the clutch lever 12, a brake lever may be attached to the holder 80.

With reference to FIG. 2 to FIG. 7, the horn switch 32 is constituted so as to swing about the swing shaft 36 installed at the end closer to the vehicle body outer side. The swing shaft 36 is disposed approximately in a perpendicular direction with respect to the axis line (D) when viewed from the front in FIG. 2. Therefore, the horn switch 32 is swung and actuated by pressing an operating surface 32e closer to the vehicle body inner side, toward the center of the axis line (D), that is, toward the vehicle body front side. According to this constitution, a part closer to the vehicle body center is pressed to actuate the horn switch 32. Therefore, even where a vehicle is driven with the thumb placed on the horn switch 32 at a position closer to the handle grip 10, that is, a position closer to the swing shaft 36, the possibility is reduced that the switch is pressed unintentionally. Further, where the horn switch 32 is actuated, the thumb is extended slightly in the vehicle body inside direction, thus making it possible to press smoothly the horn switch 32 strictly as intended by a rider.

Further, the horn switch 32 is shaped so as to give a longitudinal direction along the direction of the axis line (D). A vehicle body inward part (a part at the vehicle body center side) 32c is constituted so as to protrude from the surface of the front-side half body 61 to the rider side. This protrusion is set to gradually increase in extent toward vehicle body inward part 32c along the longitudinal direction of the horn switch 32, that is, along the direction of the axis line (D), from vehicle body outward part 32d at which the swing shaft 36 is installed. Then, in the present embodiment, there is hardly found a step between the vehicle body outward part 32d and the surface of the front-side half body 61, and the vehicle body outward part 32d hardly protrudes. According to this constitution, it is possible to easily perceive which position of the horn switch is touched by the thumb. Further, since the horn switch 32 protrudes to a lesser extent toward the handle grip, the tip of the thumb is less likely to be caught by the horn switch 32 when the thumb is moved up and down with the handle grip 10 kept held. Thus, it is possible to provide a smooth operation.

Still further, the horn switch 32 is formed so as to be increased in area of the operating surface 32e toward the vehicle body inward part 32c from the vehicle body outward part 32d. In the present embodiment, a contour line of a vehicle body upper part 32a of the horn switch 32 and that of a vehicle body lower part 32b are formed so as to make a pair with an upper part and a lower part across the axis line (D). Then, a clearance between the upper and the lower contour lines is gradually increased from the vehicle body outward part 32d toward the vehicle body inward part 32c, and the horn switch 32 is to be formed approximately in a sector form which is spread out greatly from the swing shaft 36 toward the vehicle body center side. According to the above-described constitution, a part to be pressed is secured in a sufficient area, by which the horn switch 32 can be easily pressed. Further, the thumb is moved laterally to easily perceive the shape of the switch. Still further, the horn switch 32 is decreased in area of the vehicle body outward part, by which the tip of the thumb is less likely to be caught by the horn switch 32 when the thumb is moved up and down.

Then, of the contour lines of the dimmer switch 31, a lower contour line 31a adjacent to the horn switch 32 is formed along an inclined angle of the contour line of the vehicle body upper part 32a of the horn switch 32. Further, of the contour lines of the turn signal switch 33, an upper contour line 33a adjacent to the horn switch 32 is formed with an inclined angle along the contour line of the vehicle body lower part 32b of the horn switch 32. According to this constitution, a clearance between the horn switch 32 and the dimmer switch 31 as well as a clearance between the horn switch 32 and the turn signal switch 33 are formed so as to have a certain width, thus making it possible to reduce the possibility that the other switches may be touched on operation of the horn switch 32. It is noted that the present embodiment deals with a case where two other switches are installed. However, for example, where the other switch is one, this switch may be disposed on either an upper side or a lower side of the horn switch 32. Further, where the other switches are three or more, the switches may be arranged in various ways, for example, two switches are disposed on the upper side and one is disposed on the lower side.

With reference to FIG. 4 and FIG. 5, a plate member 43 formed with a metal or the like is arranged between a front-side half body 61 and a back-side half body 62 of the housing 60. A projection 44 which is engaged with a positioning hole (not illustrated) provided on handlebar 9 is formed on the plate member 43. On attachment of the handle switch 30 to the handlebar 9, the projection 44 of the plate member 43 is positioned with respect to the positioning hole on the handlebar 9 so as to make an engagement. Then, the handlebar 9 is held between the front-side half body 61 and the back-side half body 62 and connected by using a tapping screw or the like which is inserted into a thread hole 46. A through hole 45 is to be approximately equal in diameter to the handlebar 9.

FIG. 6 is a cross sectional view taken along the line C-C in FIG. 2. Only the front-side half body 61 is illustrated in this drawing. As described previously, the horn switch 32 will swing by pressing its part closer to the vehicle body inward part 32c, that is, an operating surface 32e closer to the vehicle body center side. When the operating surface 32e is pressed toward the vehicle body front side, an inner pressing member 40 at the back of the horn switch 32 is pressed, by which a moving contact 38 moves toward a fixed contact 39. Then, the moving contact 38 connected to a wiring 41 is in contact with the fixed contact 39 fixed on the front-side half body 61, thereby actuating a horn. An elastic member 37 wound around the swing shaft 36 is fixed on the inner pressing member 40 at one end thereof and also fixed on the front-side half body 61 at the other end thereof. The horn switch 32 will return to an initial position illustrated in the drawing due to a resilient force of the elastic member 37, when a rider decreases a force for pressing the operating surface 32e.

FIG. 7 is a drawing for explaining a positional relationship of the handle switch 30 with the left hand 70 of a rider. In the present embodiment, a vehicle body inward part of the horn switch 32 is disposed at a part closer to the vehicle body center than other switches so that operation can be easily shifted to other switches on a state that the tip of a finger is placed on the horn switch 32. Such an arrangement can be realized, for example, by operating surfaces of the dimmer switch 31, the horn switch 32 and the turn signal switch 33 arranged respectively at (K), (L) and (M) points positioned on the same circular arc centering a predetermined position (J) on the handle grip 10. Then, the predetermined position (J) is set at a position close to the swinging center of the thumb, by which the operating surfaces of the three switches are to be located on a locus of the tip of the finger formed when the thumb is allowed to swing up and down with the handle grip 10 kept held, thereby each of the switches is further increased in operability.

FIG. 8 is a partially enlarged view of a two-wheeled motorcycle 100 to which a handle switch 120 of a second embodiment of the present invention is applied. The two-wheeled motorcycle 100 is a motor scooter-type vehicle having a low-level floor (not illustrated) on which a rider places his or her feet, and a leg shield 112 opposed to the legs of the rider is installed above the low-level floor. A lid member 111 for a storage space and an ignition key cylinder 110 are attached to the leg shield 112. A handle cover 102 in which a instrument panel 103 is embedded is installed above the leg shield 112. The handle cover 102 is an exterior component for covering, from the vehicle body rear side, a steering handle 104 which steers the front wheel, and a front cover 101 which embeds a headlight and a turn signal unit is attached to the vehicle body front side of the handle cover 102 so as to oppose thereto. A starter switch 109 is installed on the handle cover 102 in the vicinity of the right handle grip.

The handle switch 120 of the present embodiment is free of a switch housing separated independently on the right and left sides but constituted to arrange a vertically tilting-type dimmer switch 107, a swinging pressing-type horn switch 106 and a laterally tilting-type turn signal switch 108 in the vicinity of the handle grip on the left side of the handle cover 102 as a switch housing. These three switches are similar in arrangement and constitution as with the previously described first embodiment, by which the horn switch 106 is increased in operability and also the handle switch 120 allowing the horn switch 106 to be easily distinguishable is achieved. As described so far, the handle switch of the present invention is applicable to any shape of a switch housing or any type of a vehicle.

It is noted that a shape of the switch housing, a shape or structure of the horn switch, structures of other switches and the number thereof shall not be limited to the above-described embodiments but may be modified in various ways. For example, in the above embodiments, the horn switch is included in the handle switch on the left side of the vehicle body. However, the horn switch may be attached to the handle switch on the right side of the vehicle body. The handle switch of the present invention shall not be limited to a two-wheeled motorcycle but may be applied to a three-wheeled vehicle, a four-wheeled vehicle or others.

BRIEF DESCRIPTION OF DRAWINGS

Figure 1:
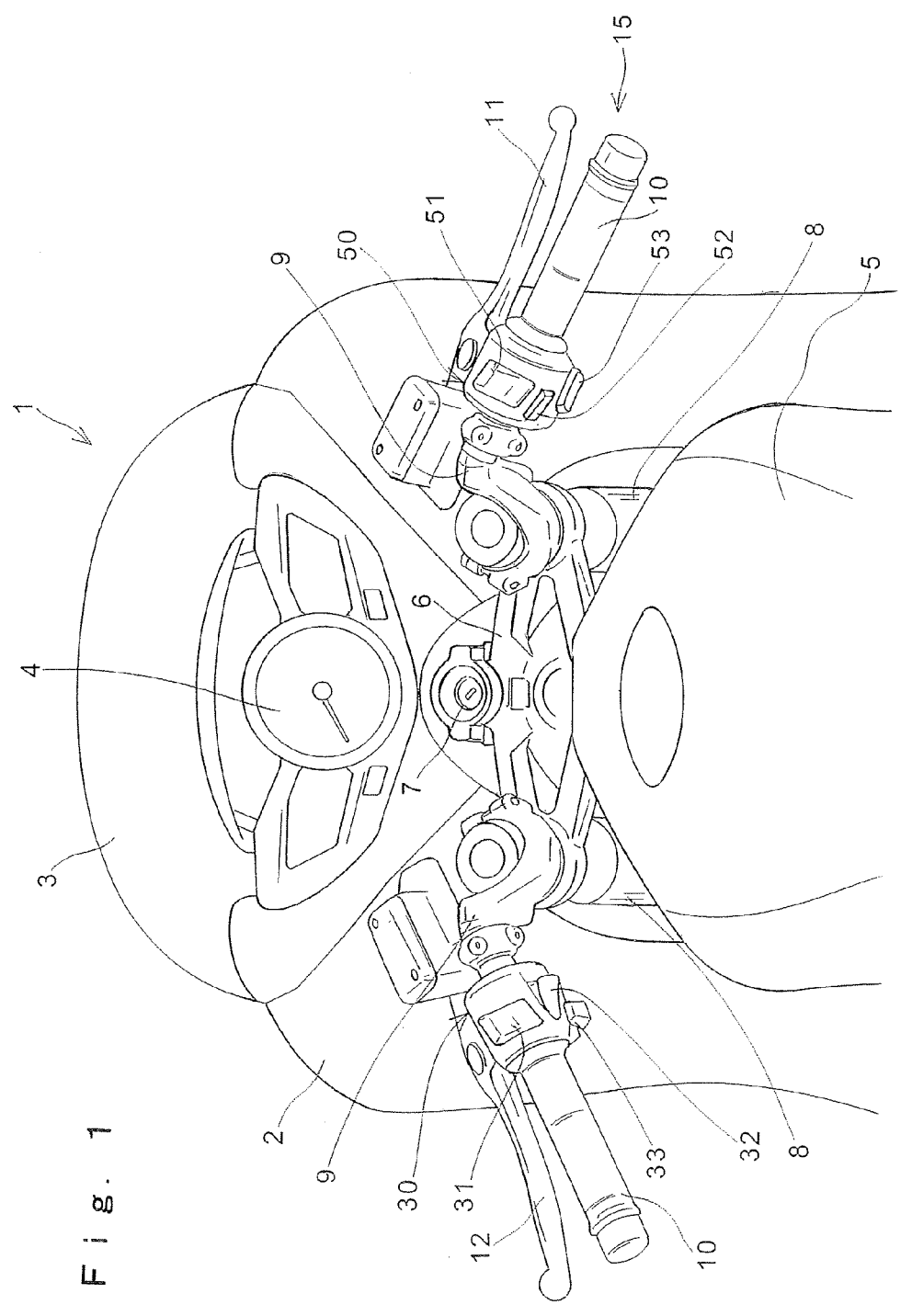

FIG. 1 is a partially enlarged view of a two-wheeled motorcycle to which a handle switch of one embodiment of the present invention is applied.

REFERENCE SIGNS LIST

Figure 2:
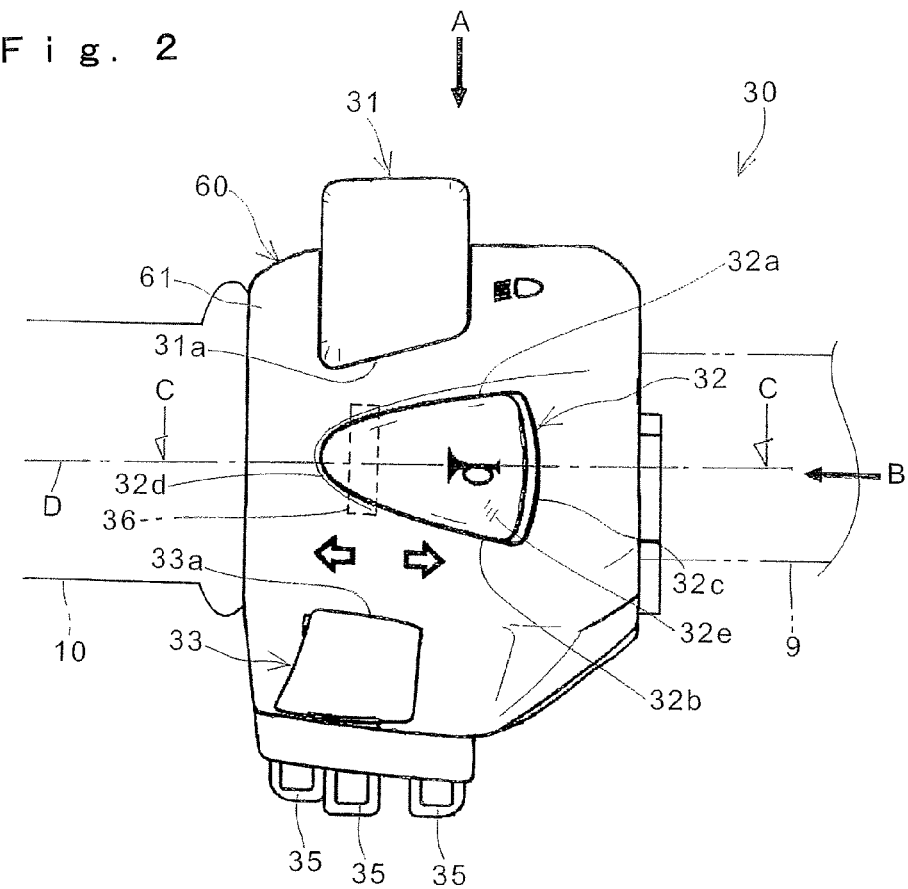
FIG. 2 is a front elevational view of the handle switch.
Figure 3:
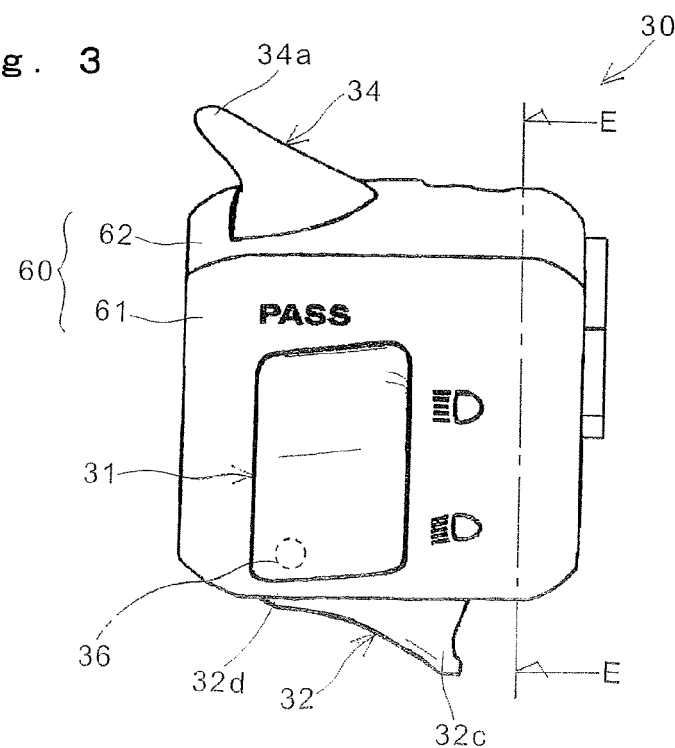
FIG. 3 is a top view as viewed in the direction of A in FIG. 2.
Figure 4:
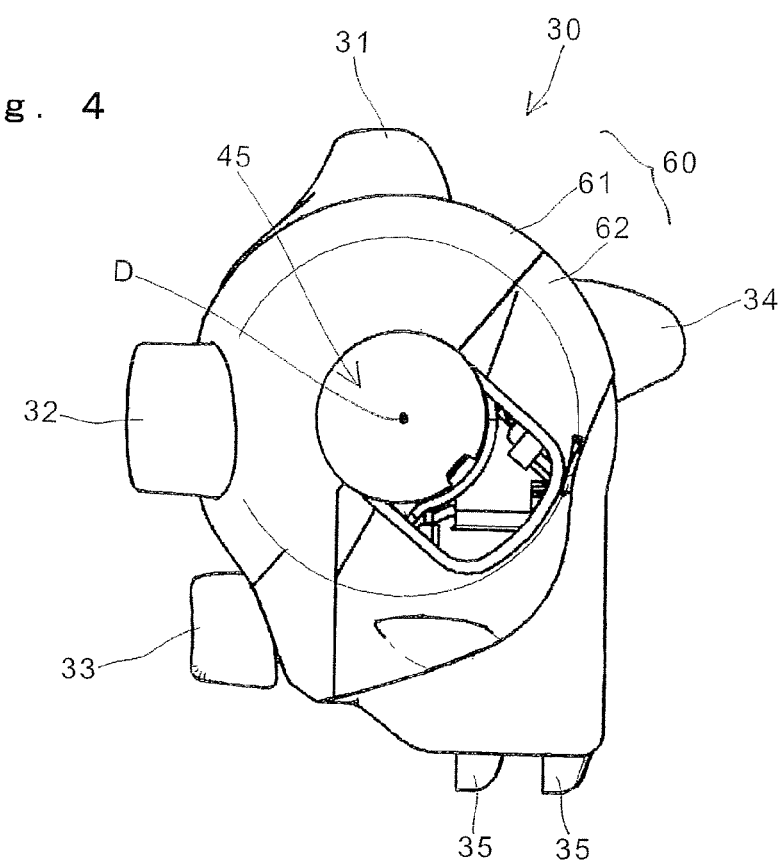
FIG. 4 is a side elevational view as viewed in the direction of B in FIG. 2.
Figure 5:
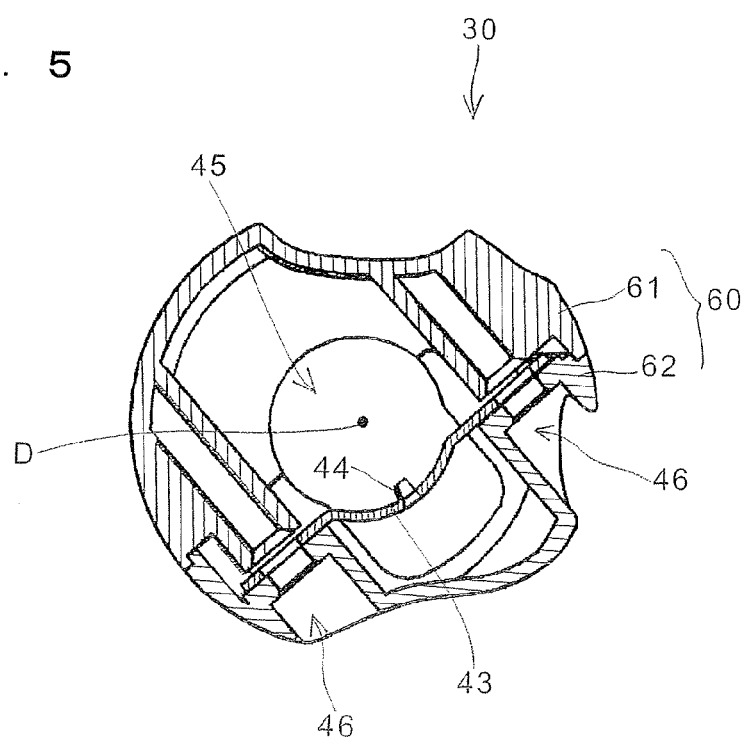
FIG. 5 is a cross sectional view taken along the line E-E in FIG. 3.
Figure 6:
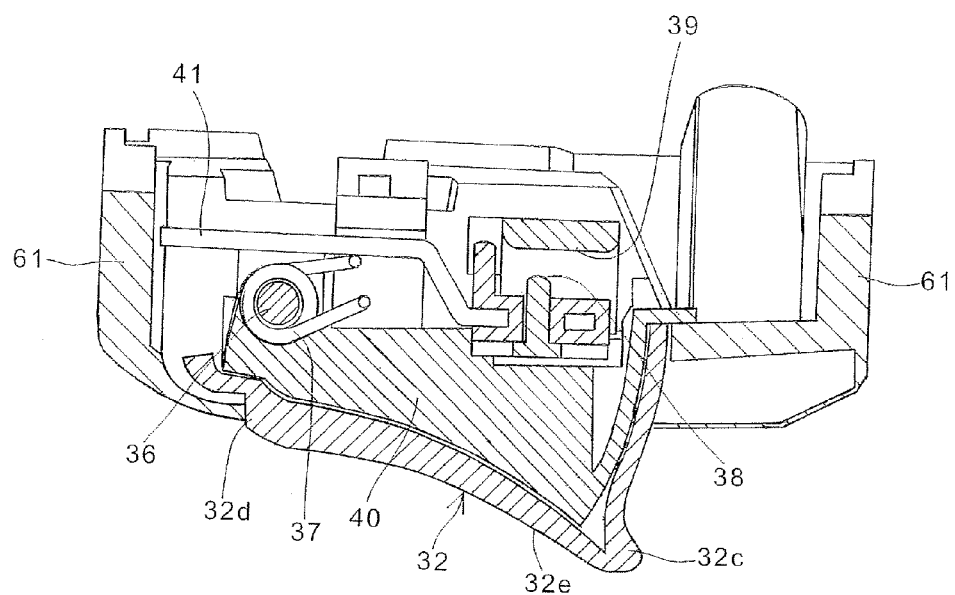
FIG. 6 is a cross sectional view taken along the line C-C in FIG. 2.
Figure 7:
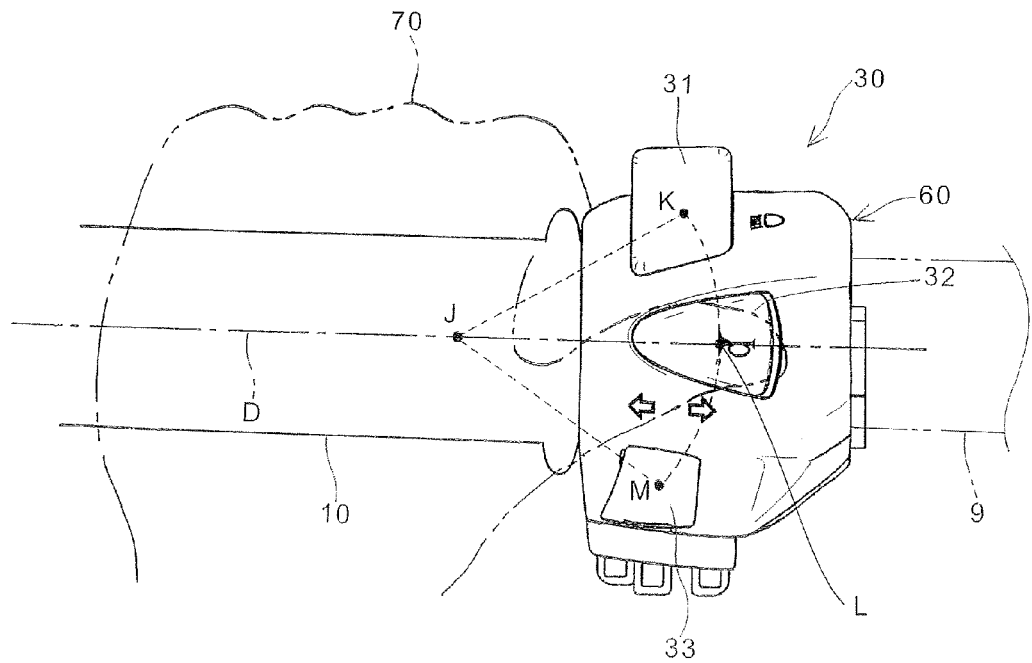
FIG. 7 is a drawing for explaining a positional relationship of the handle switch with the left hand of a rider.
Figure 8:
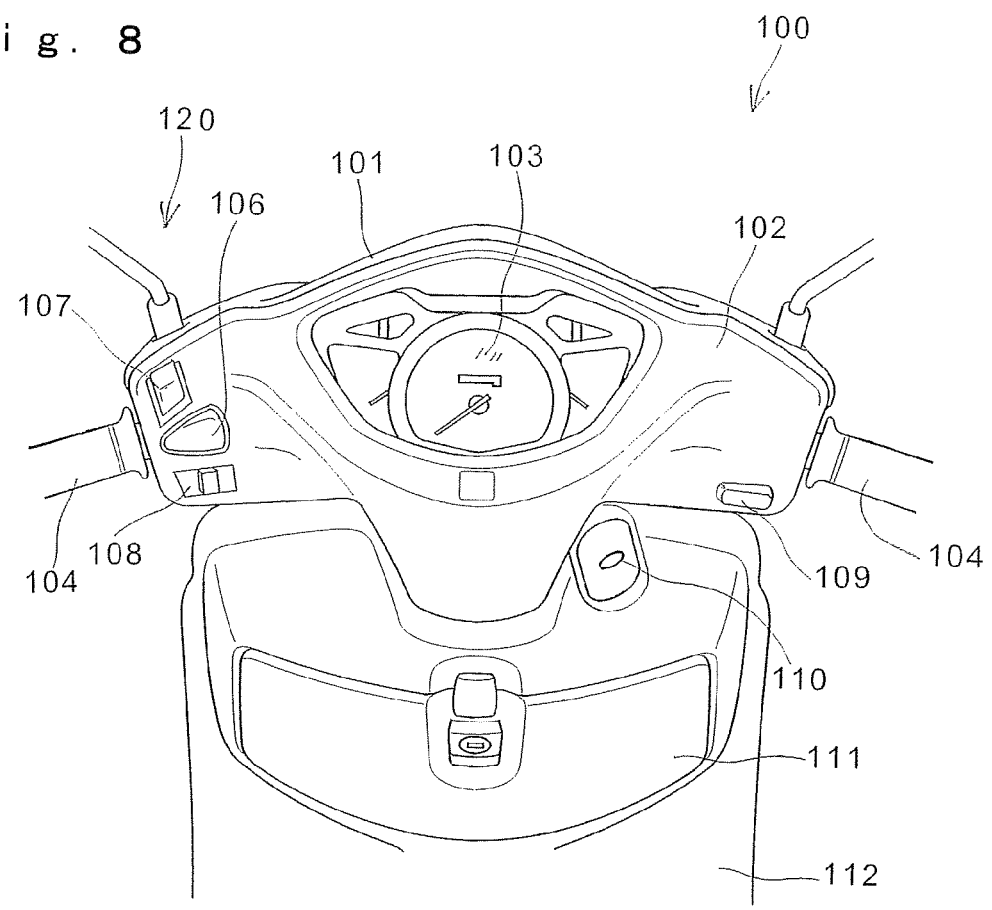
FIG. 8 is a partially enlarged view of a two-wheeled motorcycle to which a handle switch of a second embodiment of the present invention is applied.
Figure 9:
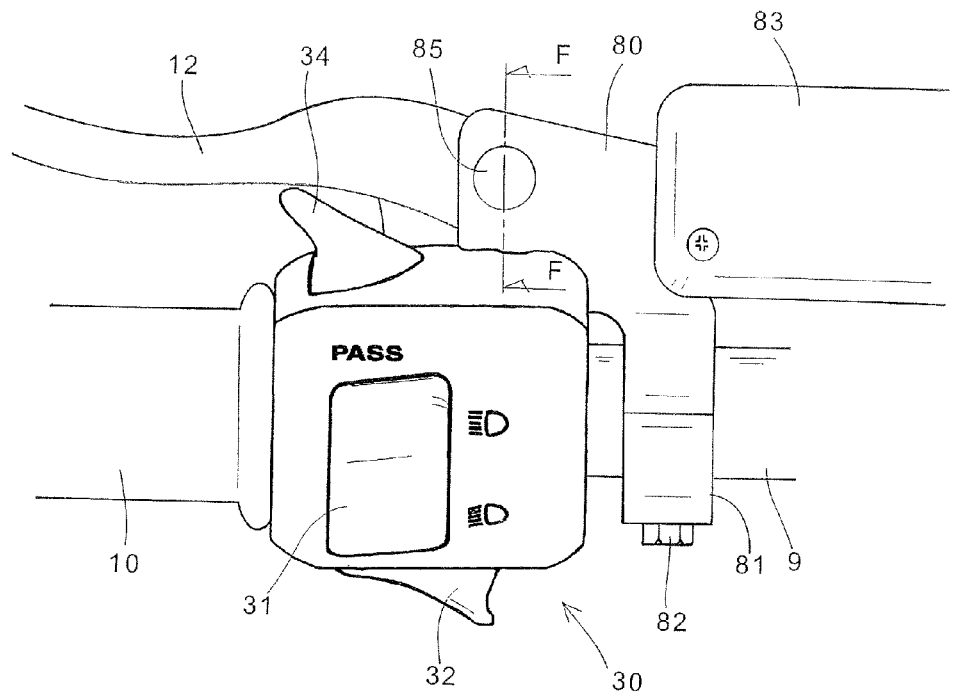
FIG. 9 is a top view of the handle switch, showing arrangement relationships with peripheral components.
Figure 10:
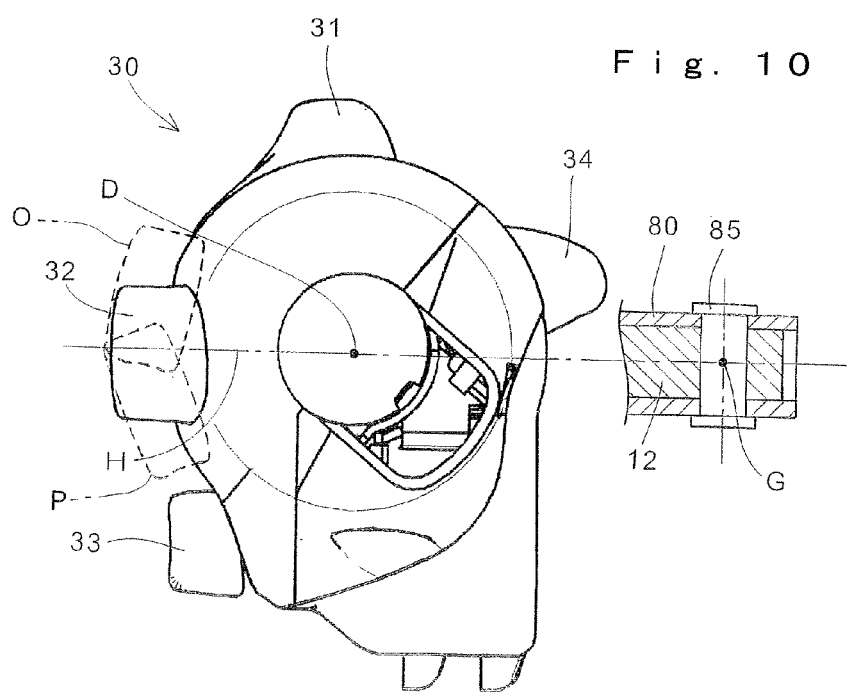
FIG. 10 is aside elevational view of the handle switch including a cross sectional view taken along the line F-F in FIG. 9.

1: two-wheeled motorcycle,
9: handlebar,
10: handle grip,
15: steering handle,
30: handle switch,
31: dimmer switch (optical-axis changing switch) (other switch),
32: horn switch,
32a: vehicle body upper part,
32b: vehicle body lower part,
32c: vehicle body inward part,
32d: vehicle body outward part,
32e: operating surface,
33: turn signal switch (other switch)
36: swing shaft,
37: elastic member,
38: moving contact,
39: fixed contact,
60: housing,
61: front-side (vehicle body rear side) half body,
62: back-side (vehicle body front side) half body,
85: pivot shaft,
D: axis line of handle grip,
G: center position of pivot shaft,
H: line

The invention claimed is:

1. A handle switch of a vehicle, comprising:
a switch housing having a horn switch and at least one of other switches, the switch housing is arranged adjacent to a handle grip attached to an end of a handlebar;
wherein the horn switch is disposed at a position which is overlapped on an axis line of the handle grip when the switch housing is projected from a driver's front view direction and also on a vehicle body rear side further than the other switches and the other switches are disposed so as to deviate vertically with respect to the horn switch;
wherein the horn switch having a swing shaft disposed approximately in a perpendicular direction with respect to the axis line from a driver's front view direction on an end of the horn switch closer to the handle grip, the horn switch is constituted so as to swing about a swing shaft by being pressed toward the axis line of the handle grip, and
wherein a lever for brake or clutch which is operated with the handle grip being held and also swings about a pivot shaft in a vehicle body front-back direction is installed adjacent to the switch housing, and the horn switch is disposed at a position which is overlapped on a line linking an axis line of the handle grip with a center position of the pivot shaft when the switch housing is projected from the axis line direction of the handle grip.

2. The handle switch of a vehicle as set forth in claim 1, wherein the horn switch is disposed so as to protrude outward from the switch housing, and the horn switch protrudes from the switch housing to a greater extent toward a vehicle body center side along the axis line of the handle grip from the end thereof closer to the handle grip.

3. The handle switch of a vehicle as set forth in claim 2, wherein the horn switch hardly protrudes at the end closer to the handle grip.

4. The handle switch of a vehicle as set forth in claim 1, wherein the horn switch is increased in area of an operating surface toward a vehicle body center along the axis line of the handle grip from the end closer to the handle grip.

5. The handle switch of a vehicle as set forth in claim 1, wherein the horn switch has two contour lines to vertically oppose each other across the axis line of the handle grip, and a clearance between the two contour lines is gradually increased towards a vehicle body center along the axis line of the handle grip from the end closer to the handle grip.

6. The handle switch of a vehicle as set forth in claim 5, wherein, of contour lines of the other switches, one side adjacent to the horn switch is formed so as to run along one of the two contour lines of the horn switch.

7. The handle switch of a vehicle as set forth in claim 1, wherein a vehicle body inward part of the horn switch is disposed closer to a vehicle body center than the other switches.

8. The handle switch of a vehicle as set forth in claim 1, wherein the horn switch is shaped so as to have its longitudinal direction on the axis line of the handle grip.

9. The handle switch of a vehicle as set forth in claim 1, wherein the other switches include at least a turn signal switch or a dimmer switch for a headlight.

10. A handle switch of a vehicle, comprising:
a switch housing having a horn switch and at least one of other switches, the switch housing is arranged adjacent to a handle grip attached to an end of a handlebar;
wherein the horn switch is disposed at a position which is overlapped on an axis line of the handle grip when the switch housing is projected from a driver's front view direction and also on a vehicle body rear side further than the other switches and the other switches are disposed so as to deviate vertically with respect to the horn switch;
wherein the horn switch having a swing shaft disposed approximately in a perpendicular direction with respect to the axis line from a driver's front view direction on an end of the horn switch closer to the handle grip, the horn switch is constituted so as to swing about a swing shaft by being pressed toward the axis line of the handle grip, and
wherein the horn switch has two contour lines to vertically oppose each other across the axis line of the handle grip, and a clearance between the two contour lines is gradually increased towards a vehicle body center along the axis line of the handle grip from the end closer to the handle grip.

11. The handle switch of a vehicle as set forth in claim 10, wherein, of contour lines of the other switches, one side adjacent to the horn switch is formed so as to run along one of the two contour lines of the horn switch.

12. The handle switch of a vehicle as set forth in claim 10, wherein a vehicle body inward part of the horn switch is disposed closer to a vehicle body center than the other switches.

13. The handle switch of a vehicle as set forth in claim 10, wherein the horn switch is shaped so as to have its longitudinal direction on the axis line of the handle grip.

14. The handle switch of a vehicle as set forth in claim 10, wherein the other switches include at least a turn signal switch or a dimmer switch for a headlight.

15. The handle switch of a vehicle as set forth in claim 10, wherein the horn switch is disposed so as to protrude outward from the switch housing, and the horn switch protrudes from the switch housing to a greater extent toward a vehicle body center side along the axis line of the handle grip from the end thereof closer to the handle grip.

16. The handle switch of a vehicle as set forth in claim 15, wherein the horn switch hardly protrudes at the end closer to the handle grip.

17. The handle switch of a vehicle as set forth in claim 10, wherein the horn switch is increased in area of an operating surface toward a vehicle body center along the axis line of the handle grip from the end closer to the handle grip.

* * * * *